United States Patent
Singh et al.

(10) Patent No.: US 8,010,971 B2
(45) Date of Patent: Aug. 30, 2011

(54) VOICE OVER INTERNET PROTOCOL REMOTE UPGRADING

(75) Inventors: Stephen Singh, Westford, MA (US); Fergal Glynn, Somerville, MA (US)

(73) Assignee: FMR LLC, Boston, MA (US)

(*) Notice: Subject to any disclaimer, the term of this patent is extended or adjusted under 35 U.S.C. 154(b) by 1442 days.

(21) Appl. No.: 11/170,119

(22) Filed: Jun. 29, 2005

(65) Prior Publication Data

US 2007/0008893 A1 Jan. 11, 2007

(51) Int. Cl.
*G06F 9/54* (2006.01)
*G06F 15/16* (2006.01)
(52) U.S. Cl. ............................ 719/321; 709/200
(58) Field of Classification Search .................. 719/321; 709/228

See application file for complete search history.

(56) References Cited

U.S. PATENT DOCUMENTS

| | | | |
|---|---|---|---|
| 7,451,921 B2* | 11/2008 | Dowling et al. | 235/380 |
| 2002/0129236 A1 | 9/2002 | Nuutinen | |
| 2002/0196776 A1* | 12/2002 | Chiang | 370/352 |
| 2003/0091024 A1 | 5/2003 | Stumer | |
| 2003/0224781 A1 | 12/2003 | Milford et al. | |
| 2004/0013109 A1 | 1/2004 | Vaananen et al. | |
| 2004/0111521 A1 | 6/2004 | Igarashi et al. | |
| 2004/0260747 A1* | 12/2004 | Ying et al. | 709/200 |
| 2005/0025136 A1 | 2/2005 | Anschutz et al. | |
| 2005/0160175 A1* | 7/2005 | Ho | 709/228 |
| 2006/0168266 A1* | 7/2006 | Phillips et al. | 709/230 |

\* cited by examiner

*Primary Examiner* — Andy Ho
*Assistant Examiner* — Abdou Seye
(74) *Attorney, Agent, or Firm* — Fish & Richardson P.C.

(57) ABSTRACT

An application destined for a client VoIP device is available at a service provider 20 and is loaded first to a client-side device over an unsecure public network, using a secure protocol. The VoIP device is not able to receive the application directly using the secure protocol and the client side device is instructed to load the application to the client VoIP device over a private network using an unsecure protocol.

21 Claims, 2 Drawing Sheets

VOICE OVER INTERNET PROTOCOL REMOTE UPGRADING

BACKGROUND

This invention relates to updating voice over internet protocol (VoIP) and related network devices.

The VoIP promises economical, convenient and flexible voice and other media communication over internet protocol based networks. The providers of VoIP telephony offer their subscribers unprecedented low, long distance and international, rates and a number of attractive services. Popular services that attract an increasing number of subscribers include traditional telephony oriented services, such as multiple lines and phone numbers, voice and video conferencing, intelligent forwarding, auto answering and, efficient customer assistance. At the same time, the Internet environment facilitates provisioning of VoIP services based on integrating voice with multi media messaging and electronic commerce. To support the emerging services, the VoIP providers deploy new type of phone devices, capable to support voice, text and image communication. Some of the new phone devices, such as the session initiation protocol (SIP) phones are deployed in home and office local area networks (LANs). As the VoIP services are continuously improved and new services are provided, both the phone devices and the supporting network devices need to be updated in order to support the latest versions of the VoIP services.

SUMMARY

In one aspect, in general, a method for communication includes providing an application to a first client-side device over a public network. The application is for a second client-side device, which supports voice over internet protocol (VoIP) traffic. A first protocol is used for providing the application to the first client-side device over the public network. The first client-side device is directed to load the application on the second client-side device. The first client-side device is connected to the second-client side device over a private network and the first client-side device uses a second protocol to load the application on the second client-side device. The second client-side device has an inability to receive the application using the first protocol.

One or more of the following features may be included. The second client-side device is a VoIP device, e.g., a VoIP phone. The first protocol is a secure network protocol, for example, a secure sockets layer protocol. The second protocol is an unsecure network protocol, for example, a trivial file transfer protocol. The application is provided in a hyper text transfer protocol secure server, at a location associated with a uniform resource locator. The first client-side device is alerted when the application is available over the public network at the location associated with the uniform resource locator. The first client-side device is alerted by sending an electronic message, such as, an electronic mail message, an instant messenger message, a short message service message or a media message service message to a user associated with the first client-side device. When the user associated with the first client-side device accesses the uniform resource locator, the application is uploaded to the first client-side device. Uploading the application to the first client-side device includes authenticating the user associated with the first client-side device, allowing uploading only with a secure sockets layer protocol, checking the integrity of the application in the first client-side device when the uploading was finished and recording in the hyper text transfer protocol secure server a log entry when the uploading was finished. The user associated with the first client-side device may be a human operator or a program that runs on the first client-side device.

The application has a program to run on the second client-side device and a configuration that includes a set of configuration parameters for the program. The first client-side device identifies the second client-side device in which to load the application, configures the second client-side device to receive the application and restarts the second client-side device. When restarted, the second client-side device receives the application, including the program, applies the set of configuration parameters to the program and runs the program. The second client-side device may be a voice over internet protocol phone or a networking device involved in the voice over internet protocol traffic. After restart, the second client-side device places a call to a designated voice over internet protocol server. An administrator or a program may combine the log entry recorded in the hyper text transfer protocol secure server and the call to the designated voice over internet protocol server to report the loading of the application on the second client-side device.

The application may be sent over the public network to the first client-side device in an expedite mode as an attachment to an electronic mail message.

Certain implementations may have one or more of the following advantages. For example, the clients get their VoIP devices updated at the side where the VoIP devices are used. To update their VoIP devices, the clients neither physically move their VoIP devices nor spend time bringing the devices at a service provide service. At the same time, the service providers may keep a clear evidence of the status of each VoIP device and control the updating process of each device of all of their clients. The updating process requires minimal or no operator intervention and may be executed with no impact on client activities, for example, being executed overnight. The advantages may be extended in updating network devices that participate in the VoIP traffic, such as home networking routers, wireless access point devices, set top boxes.

Other features and advantages of the invention are apparent from the following description, and from the claims.

DESCRIPTION

Figure 1:
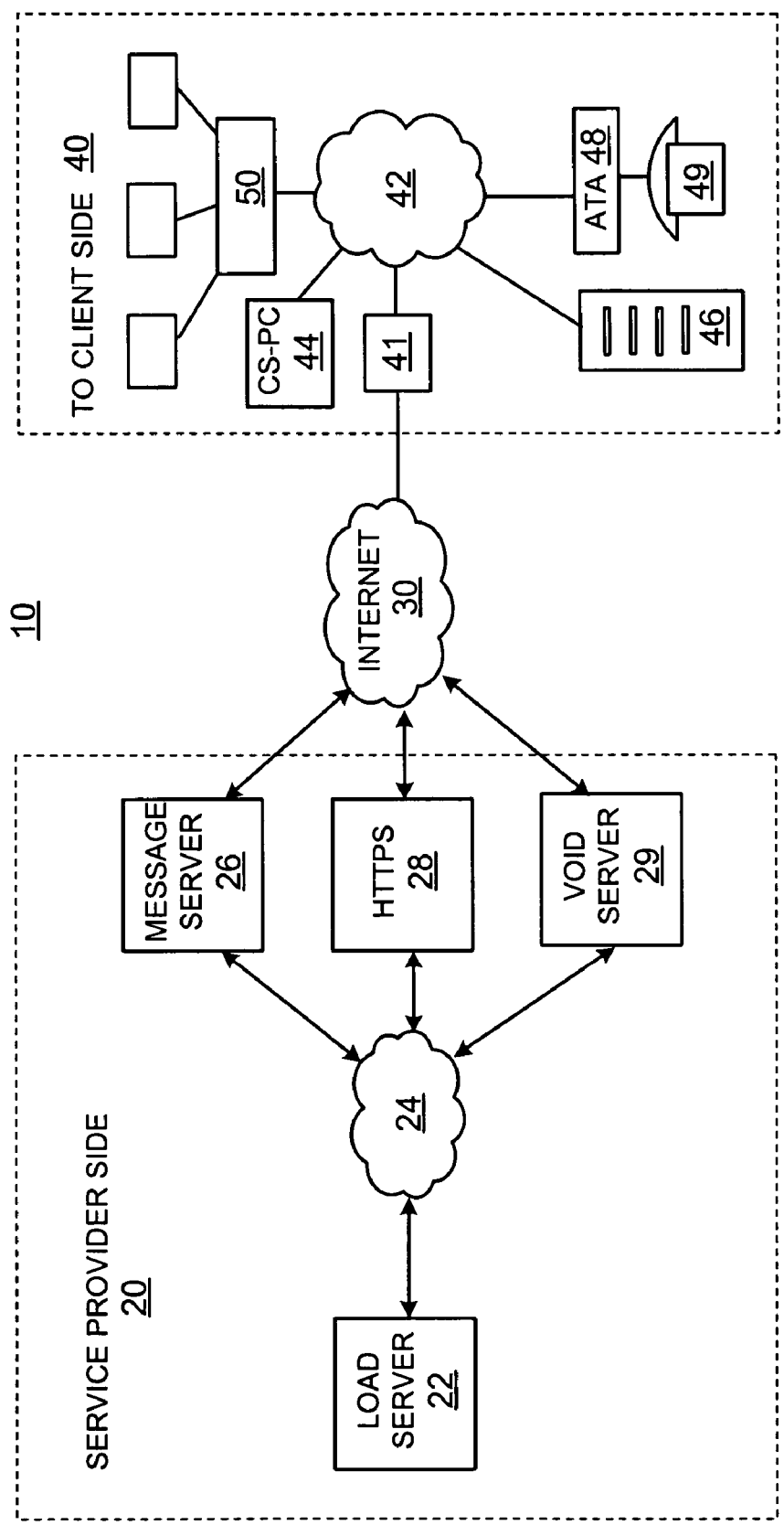
FIG. 1 is a block diagram of an exemplary network for VoIP communication.

As shown in FIG. 1, a network 10 enables a service provider 20 to update over a public network, such as a public Internet 30, devices located remotely at an exemplary client 40. The service provider 20 includes a load server 22, which is connected to each of a message server 26 (MS), a hyper text transfer protocol secure server 28 (HTTPS) and a Voice over Internet Protocol (VoIP) server 29 (VoIPS) via a local area network (LAN) 24. The MS 26, HTTPS 28 and VoIPS 29 can communicate with client networks through the public Internet 30. At the client 40, a router 41 connects a private LAN 42 to the Internet 30. A client-side PC 44 (CSPC), a VoIP phone 46, an Analog Telephone Adapter 48 (ATA) of an analog phone 49, and a network switching device 50 are connected to the LAN 42, which enables each of them to access the Internet 30. The VoIP phone 46 may be a standalone physical device or a VoIP application in a personal computer (PC).

The load server 22 at the service provider 20 serves as a host to versions of applications developed for devices owned by clients of the service provider 20. Test engineers at the service provider 20 test the newest versions of the applications first in laboratories and subsequently in pilot networks. When the test engineers determine that an application performs according to a corresponding quality specification, they store the application in the load server 22. For example, at a VoIP service provider 20, the test engineers test applications for VoIP phones, such as, service initiation protocol (SIP) phones. As VoIP technologies are evolving very rapidly, new VoIP applications and new versions of previously released VoIP applications (further referred to as "VoIP update") are frequently released. When the test engineers successfully complete the testing of a new VoIP update, the VoIP update is ready to be installed in client VoIP phones. Different clients own different types of VoIP phones, for which are developed, tested and stored, different VoIP updates. When the test engineers store a VoIP update for a certain type of VoIP phone in the load server 22, an administrator attaches to the VoIP update a list of client VoIP phones. The client VoIP phones that are to be updated to use the VoIP update are located at clients 40. At any point in time, the list of client VoIP phones attached to a certain VoIP update stored in the load server 22 indicates which VoIP phones need to be updated and, as will be explained later, which VoIP phones were updated. In some embodiments, the VoIP updates are compressed when stored in the load server 22 in order to consume less of the storage capacity of the server 22 and at the same time ease VoIP update transmissions over the Internet 30.

Figure 2:
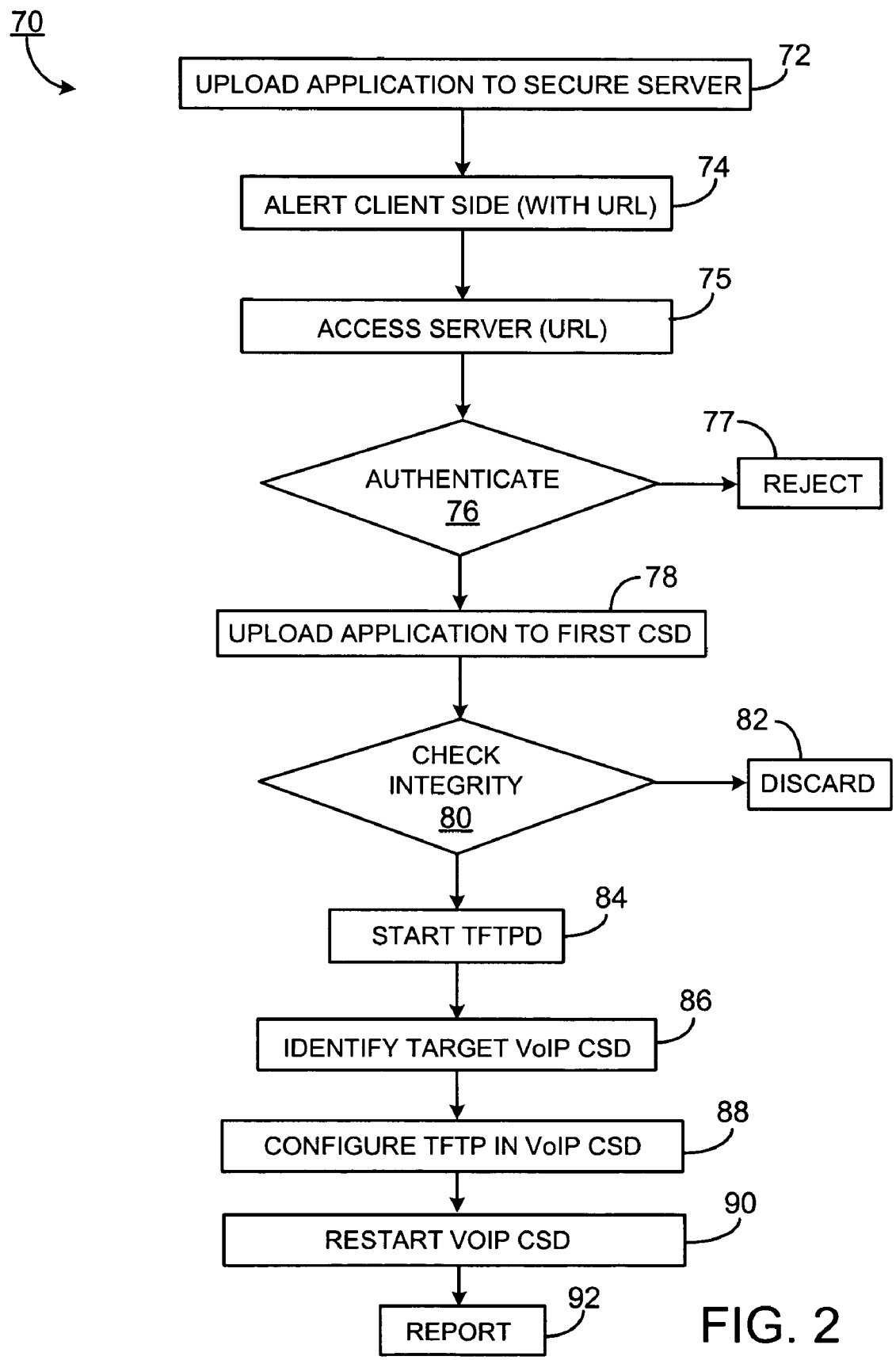
FIG. 2 is a flowchart of a process for updating components in a VoIP network.

As shown in FIG. 2, a process 70 illustrates the updating of one or more client-side devices at clients 40 with VoIP updates tested and made available at the service provider 20. As a non limiting example, updating VoIP phones is explained further.

A release engineer at the service provider 20 uploads (72) a VoIP update to the HTTPS 28, making it available to clients 40 over the Internet 30. In some embodiments, the upload may be executed automatically by a release program that runs in the load server 22, when a new VoIP update is stored in the load server 22. The release engineer or the release program includes within the VoIP update configuration information, (e.g., a VoIP update version number, a VoIP device type, the Internet Protocol (IP) address of the VoIPS 29 and a VoIP phone number associated with the VoIPS 29). Particularly, the VoIP device type is used, as explained later, to identify the VoIP devices targeted to use the VoIP update.

When the VoIP update is available in the HTTPS 28, the release engineer or release program instructs the MS 26 to alert (74) the client 40 that a VoIP update is available in the HTTPS 28. To alert the client 40, the release engineer or release program instructs MS 26 to send an alerting message to the client 40. The MS 26 is configured to include in the alerting message a URL that points to the HTTPS 28. The release engineer or release program inspects the list of client VoIP phones attached to the VoIP update to identify which client 40 to alert. An alerting message is sent to each client 40 that hosts one or more VoIP phones of the list of client VoIP phones attached to the VoIP update. The MS 26 may send the alerting message in the body of an e-mail message over the Internet 30. Alternatively, the MS 26 may transmit the alerting message in an Instant Message (IM) session established over the Internet 30. Alternatively, the MS 26 may use a Short Message Service (SMS) or a Media Message Service (MMS) over a wireless access network to access the Internet 30 in order to deliver the alerting message at the client 40.

At the client 40, the alerting message is received by the CSPC 44. A user at the CSPC 44 extracts from the alerting message the URL that points to the HTTPS 28. The user starts a browser program and uses the extracted URL to access (75) the HTTPS 28. When accessed, the HTTPS 28 first authenticates the user and checks his/her rights to access (76) the HTTPS content. Users that cannot be authenticated are rejected (77).

The HTTPS 28 uploads (78) the VoIP update to a CSPC 44, where the user was authenticated. In order to upload the VoIP update, the HTTPS 28 opens a secure sockets layer (SSL) connection with the CSPC 44 over the Internet 30. SSL is a protocol developed for transmitting private documents over the public Internet. SSL works by encrypting data, using a private key, before data is transmitted over the SSL connection. The HTTPS 28 securely transfers the VoIP update to the CSPC 44 over such a secure SSL connection. When the HTTPS 28 completes the uploading of the VoIP update to the CSPC 44, the HTTPS 28 enters a log entry in a log file. The HTTPS maintains the log file to record events, such as the VoIP update being successfully uploaded to the CSPC 44.

After the VoIP update is uploaded to the CSPC 44, the user at the CSPC 44 checks (80) the integrity of the uploading, for example, using a hashing method, such as the MD5 algorithm, developed in the Internet community (RFC 1321) to check the integrity of the transmission of large compressed and encrypted files. The VoIP updates that fail the MD5 checking are discarded (82).

Once the VoIP update integrity is checked, the user at the CSPC 44 decompresses the VoIP update into a VoIP update file and separates the configuration information in a VoIP configuration file, for example, in temporary directories of the CSPC 44 file system. Next, the user starts (84) a trivial file transfer protocol demon (TFTPD) in CSPC 44. The TFTPD in CSPC 44 plays the role of a trivial file transfer protocol (TFTP) server, which allows the VoIP update file and VoIP configuration file to be transferred from the CSPC 44 to client-side devices (46, 48 and 50).

Further, the user at the CSPC 44 identifies (86) a set of VoIP devices, for example, VoIP phones and ATAs attached to the private LAN 42. In one embodiment, the user explores the networked devices using the simple network management protocol (SNMP). SNMP retrieves device identification information from what is called management information base (MIB), from each device attached to the LAN 42. In another embodiment, the user may login to devices attached to the LAN 42 using the telnet protocol and retrieve device identification information from a login screen. In either case, the user extracts the type of the VoIP device, from the device identification information, and compares it with the VoIP device type found in the VoIP configuration file to identify the VoIP devices targeted to be updated.

The user at the CSPC 44 then uses SNMP to configure (88) the TFTP parameters in the VoIP devices targeted to be updated, such as the VoIP phone 46 and ATA 48. In particular, TFTP is configured, in each VoIP device, to download the VoIP update file and the VoIP configuration file from the temporary directories of the CSPC 44 file system. Alternatively, the user may use telnet to login in to a VoIP phone or ATA and configure (88) the TFTP parameters directly using console commands presented in a configuration screen.

After configuring TFTP in each identified VoIP and ATA, the user at the CSPC 44 restarts (reboots) each identified VoIP and ATA, using SNMP traps or direct telnet console commands.

It is to be noted that the user at the CSPC 44 may be a human operator or a program that runs in the CSPC 44.

When the VoIP phone 46, the ATA 48 and other client-side VoIP devices reboot, they load the VoIP update file and the VoIP configuration file from the CSPC 44, using TFTP. The rebooted devices run the application from the VoIP update file, configured with parameters from the VoIP configuration file. The application may be a VoIP telephony executable program, an operating system driver or a patch program that adds a new feature to the VoIP telephony executable program. The VoIP configuration file may include network addresses of VoIP network components such as gateways, soft-switches or servers. For example, in a SIP network, the VoIP configuration file may include IP addresses of SIP registrar servers, SIP redirect servers and/or SIP Proxy servers, to enable the SIP phones to communicate in the SIP network.

As part of their reboot sequence, the VoIP phone 46, the ATA 48 and other client-side VoIP devices report (92) to the service provider 20 that they were successfully updated. To report (92), the updated VoIP devices at the client 40 extract the IP address of the VoIPS 29 and the VoIP phone number associated with the VoIPS 29 from the VoIP configuration file. Subsequently, each updated VoIP device sends a call establishment message that includes the VoIP phone number associated with the VoIPS 29 over the Internet 30 at the IP address of the VoIPS 29. The call establishment message includes information that identifies the VoIP caller device. For example, the VoIP phone 46, in a SIP network, may send a SIP INVITE message that includes a Call-ID field, which uniquely identifies the VoIP phone 46. The VOIPS 29 receives the call establishment message and extracts the information that identifies the VoIP caller device. In the SIP example, the VOIPS 29 extracts the Call_ID field. The VOIPS 29 sends the information that identifies the VoIP caller devices that were updated to the load server 22. The load server 22 updates the corresponding list of client VoIP phones to indicate which VoIP phones were updated.

It should be noted that the process 70 may be applied to update any network device that supports TFTP or other file transfer protocol. For example, the exemplary network switching device 50 attached to the LAN 42 at the client 40 may receive updates of its operating software and configuration from the CSPC 44 when the CSPC 44 receives the related updates over the Internet 30. The CSPC 44 may provide the operating software updates, executables and configuration, in a small office-home office (SOHO) environment to a number of types of networking devices. Such devices include, but are not limited to, SOHO wireline and wireless routers, wireless access points, set top boxes, DSL and cable modems.

It is to be understood that the foregoing description is intended to illustrate and not to limit the scope of the invention, which is defined by the scope of the appended claims. Other embodiments are within the scope of the following claims.

What is claimed is:

1. A computer-implemented method for updating a voice over Internet protocol ("VoIP") application on one or more VoIP devices, the method comprising:
    receiving by one or more computing systems information specifying an update for the VoIP application, and a list of types of VoIP devices to be updated, wherein the update comprises a set of configuration parameters;
    generating by the one or more computing systems a message comprising the information specifying the update, and the list of the types of VoIP devices to be updated;
    authenticating a user associated with a first client-side device;
    sending by the one or more computing systems the message to the first client-side device;
    uploading the update to the first client-side device;
    checking an integrity of the update in the first client-side device; and
    causing the first client-side device to perform operations comprising:
        determining a type of a second client-side VoIP device, with the second client-side device differing from the first client-side device;
        determining that the type of the second client-side device matches at least one of the types of VoIP devices to be updated;
        configuring the second client-side device to receive the update; and
        restarting the second client-side device to cause the second client-side device to apply the set of configuration parameters and run the update.

2. The method of claim 1 wherein the sending uses a secure network protocol.

3. The method of claim 1 wherein the sending uses a secure sockets layer protocol.

4. The method of claim 1 wherein configuring uses an unsecure network protocol.

5. The method of claim 1 wherein configuring uses a trivial file transfer protocol.

6. The method of claim 1 further comprising:
    providing the VoIP application at a location associated with a uniform resource locator; and
    sending an electronic message to the first client-side device, the electronic message comprising information to alert the first client-side device that the VoIP application is available at the location associated with the uniform resource locator.

7. The method of claim 6 wherein the electronic message is an electronic mail message.

8. The method of claim 6 wherein the electronic message is an instant messenger message.

9. The method of claim 6 wherein the electronic message comprises one or more of a short message service message and a media message service message.

10. The method of claim 6 wherein providing the VoIP application at the location associated with the uniform resource locator comprises uploading the VoIP application to the first client-side device in response to the first client-side device accessing the uniform resource locator.

11. The method of claim 1, further comprising:
    recording a log entry when the uploading is finished.

12. The method of claim 1, wherein the user comprises a human operator.

13. The method of claim 1, wherein the user comprises a program configured to run on the first client-side device.

14. The method of claim 1, wherein the second client-side device comprises a VoIP phone.

15. The method of claim 1, wherein the second client-side device comprises one or more of a home office router, a wireless access point, a set top box, a digital subscriber line modem, and a cable modem.

16. The method of claim 1, further comprising:
    placing a call from the second client-side device to a VoIP server; and
    combining a log entry and the call to report the loading of the VoIP application on the second client-side device.

17. The method of claim 1 wherein sending the message to the first client-side device comprises sending the VoIP application as an attachment to an electronic mail message.

18. An apparatus comprising:
    a processor; and a computer program product residing on a non transitory computer readable storage medium for updating a voice over Internet protocol ("VoIP") application on one or more VoIP devices, the computer program product comprising instructions for causing the processor to:
  receive information specifying an update for the VoIP application, and a list of types of VoIP devices to be updated, wherein the update comprises a set of configuration parameters;
  generate a message comprising the information specifying the update, and the list of the types of VoIP devices to be updated;
  authenticate a user associated with a first client-side device;
  send the message to the first client-side device;
  upload the update to the first client-side device;
  check an integrity of the update in the first client-side device; and
  cause the first client-side device to perform operations comprising:
    determining a type of a second client-side device, with the second client-side device differing from the first client-side device;
    determining that the type of the second client-side device matches at least one of the types of VoIP devices to be updated;
    configuring the second client-side device to receive the update; and
    restarting the second client-side device to cause the second client-side device to apply the set of configuration parameters and run the update.

19. The apparatus of claim 18, further comprising instructions for causing a processor to:
  provide the VoIP application at a location associated with a uniform resource locator; and
  send an electronic message to a user associated with the first client-side device, the electronic message comprising information to alert the first client-side device that the VoIP application is available over the public network at the location associated with the uniform resource locator.

20. A computer program product residing on a non-transitory computer readable storage medium for updating a voice over Internet protocol ("VoIP") application on one or more VoIP devices, the computer program product comprising instructions for causing the processor to:
  receive information specifying an update for the VoIP application, and a list of types of VoIP devices to be updated, wherein the update comprises a set of configuration parameters;
  generate a message comprising the information specifying the update, and the list of the types of VoIP devices to be updated;
  authenticate a user associated with a first client-side device;
  send the message to the first client-side device;
  upload the update to the first client-side device;
  check an integrity of the update in the first client-side device; and
  cause the first client-side device to perform operations comprising:
    determining a type of a second client-side device, with the second client-side device differing from the first client-side device;
    determining that the type of the second client-side device matches at least one of the types of VoIP devices to be updated;
    configuring the second client-side device to receive the update; and
    restarting the second client-side device to cause the second client-side device to apply the set of configuration parameters and run the update.

21. The computer program product of claim 19, further comprising instructions for causing the processor to:
  provide the VoIP application at a location associated with a uniform resource locator; and
  send an electronic message to a user associated with the first client-side device, the electronic message comprising information to alert the first client-side device that the VoIP application is available over the public network at the location associated with the uniform resource locator.

* * * * *

UNITED STATES PATENT AND TRADEMARK OFFICE
CERTIFICATE OF CORRECTION

| | | |
|---|---|---|
| PATENT NO. | : 8,010,971 B2 | Page 1 of 1 |
| APPLICATION NO. | : 11/170119 | |
| DATED | : August 30, 2011 | |
| INVENTOR(S) | : Stephen Singh et al. | |

It is certified that error appears in the above-identified patent and that said Letters Patent is hereby corrected as shown below:

Column 6, Line 6, in Claim 1, after "client-side" delete "VoIP".

Signed and Sealed this
Twenty-fifth Day of October, 2011

David J. Kappos
*Director of the United States Patent and Trademark Office*